Patented Mar. 11, 1941

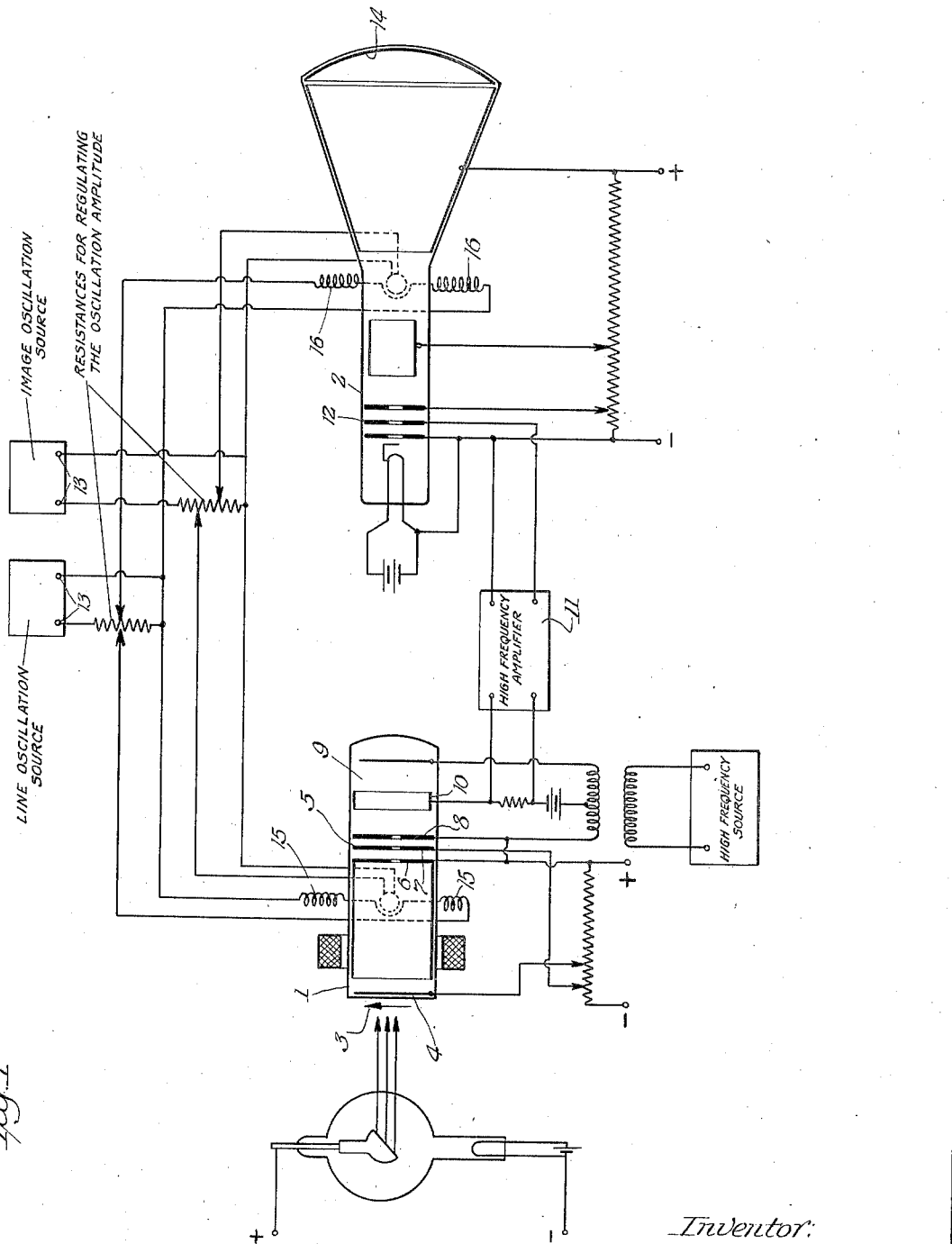

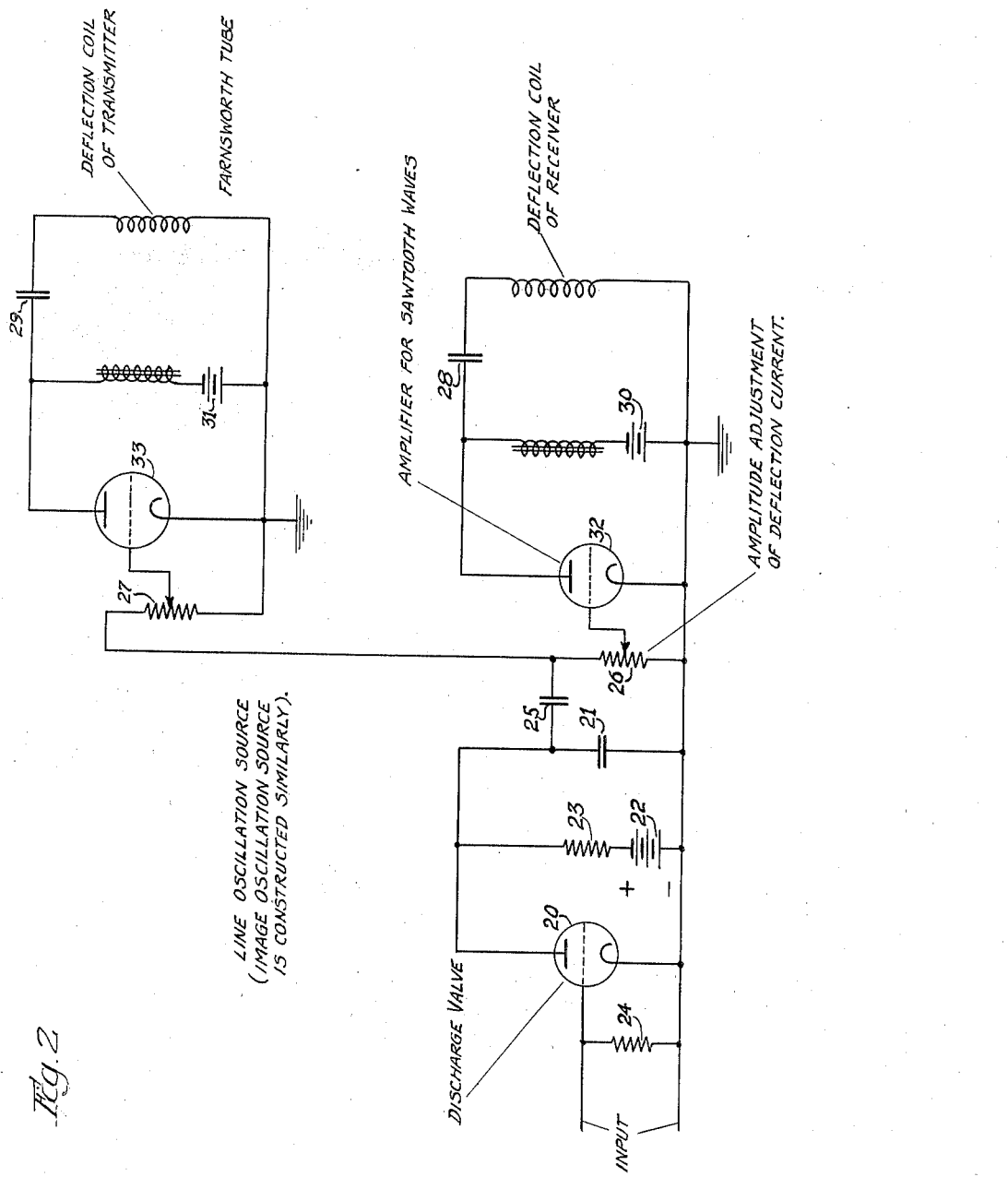

2,234,806

UNITED STATES PATENT OFFICE 2,234,806

METHOD OF ELECTRONOPTICALLY ENLARGING IMAGES

Martin Ploke, Dresden, Germany, assignor to Zeiss Ikon Aktiengesellschaft, Dresden, Germany Application February 28, 1938, Serial No. 193,003
In Germany November 20, 1936

3 Claims. (Cl. 178—6.8)

The invention relates to improvements in a method of electronoptically enlarging images of an object.

It is an object of the present invention to convert first a visible image into an electron image, then to dissect this electron image into image points and to conduct the electrical image point impulses to a Braun tube which is employed to reassemble or reproduce the image in an enlarged and visible form. The enlargement of the image is accomplished by making the amplitude of the oscillation which determines the back and forth movement of the electron image of the image dissector tube over the apertured anode smaller than the amplitude of the oscillation which determines the extent of the back and forth movement of the electron beam in the Braun tube. The enlargement which is obtained corresponds to the ratio of the two oscillations.

Another object of the invention is to employ in the image dissector tube an apertured anode constructed as an electric lens, so that it is possible to obtain the necessary minute dissection of the image, essential for a good enlargement, by decreasing the effective aperture of the apertured anode in the same degree in which the amplitude of the oscillations of the image dissector tube is decreased.

The invention also has the object of overcoming any decrease in brightness of the assembled image by amplifying the intensity of the impulse current between the dissector tube and assembling tube.

Still another object of the invention is to project the image of the objects to be enlarged with light of short wave length, as with ultraviolet rays or X-rays, upon the photo cathode of the image dissector tube, in order to obtain a very high dissecting capacity of the electronoptical system.

Other objects of the invention will be apparent from the following description, forming a part of this specification, but the invention is not limited to the embodiment herein described, as various other embodiments may be adopted within the scope of the claims:

The drawings illustrate diagrammatically and by way of example one arrangement for practicing the invention.

Fig. 1 illustrates diagrammatically an electronoptically enlarging system of the invention, and Fig. 2 illustrates diagrammatically a line oscillation source forming a portion of the system.

Referring to the drawings, 1 is an image dissector tube and 2 a Braun tube. An image of the object 3 is projected by well known optical means onto the photo cathode 4 of the image dissector tube 1, preferably with ultraviolet rays or X-rays. The electrons released from the photo cathode 4 in response to the light striking the same are combined to an electron image in the plane of the apertured anode 5. In the present instance the apertured anode 5 is composed of three axially alined apertured electrodes 6, 7 and 8 forming in their entirety an electric lens.

The electron image is moved in customary manner back and forth over the apertured anode 5 by suitably arranged magnetic deflecting fields indicated diagrammatically by coils 15. The electron currents passing through the anode 5 and which represent each one image point enter the dynamic multiplier 9 of known construction. This multiplier multiplies or amplifies the image point electron currents whereby the same are received intensified values by the collecting electrode 10.

The collecting electrode 10 conducts the multiplied image point electron currents into a high frequency amplifier 11, the output of which is connected with the light control electrode 12 of the Braun tube 2.

The electron beam of the Braun tube 2 is deflected through magnetic fields again indicated diagrammatically by coils 16 in the same manner as the electron image in the image dissector tube 1, for which purpose an oscillation producing element is applied to the terminals 13, so that the well known television scanning is obtained. In the Braun tube the image points produced by dissecting the electron image in the dissector tube are thus assembled and converted again into a visible image appearing on the fluorescent screen 14.

Fig. 2 illustrates the line oscillation source of the system, whose input is connected with an impulse generator, for instance a mechanical interrupter in an electric circuit. The impulses control the grid of the discharge valve 20 in such manner, that the charging condenser 21 is periodically discharged over the valve 20. The condenser 21 is charged by the battery 22 over the resistance 23. The grid leak resistance is designated with 24. The charging circuit containing the condenser 21, the battery 22 and the resistance 23 is connected by a condenser 25 with the circuits which supply the deflecting voltages. Potentiometers 26 and 27 are provided for adjusting the amplitude of the deflecting voltages. The condensers 28 and 29 protect the deflecting coils of the receiver and transmitter respectively against direct current. The batteries 30 and 31 supply the required anode potentials for the amplifier valves 32 and 33 respectively.

The image oscillation source is similarly constructed as the just described line oscillation source.

The ratio of the enlargement depends upon the ratio of the amplitudes of the oscillations applied to the image dissector tube and the Braun tube respectively. The potentials applied to the electrodes of the dissector tube and Braun tube respectively for example may be as indicated in the drawings.

The method of the present invention is not only adapted for enlarging images of objects which are arranged outside of the dissector tube and are projected onto the photo cathode of the same, but may also be used for producing visible enlarged images of incandescent cathodes, photo cathodes and the like, so that it is possible to study the emission property and other properties of these bodies. Likewise, enlarged and visible images of bodies irradiated with electrons may be produced. Furthermore, the Braun tube, which is employed for producing the enlarged image may be substituted by other reproducing means employed in the television art.

What I claim is:

1. In a method of electronoptically enlarging images of objects which comprises converting a light image of the object into an electron image, moving said electron image back and forth over a stationary aperture by subjecting said electron image to deflecting fields produced by a source of oscillations, and controlling by the electron currents passing through said aperture and which represent image points of said electron image the intensity of the electron beam of a Braun tube which reproduces an enlarged visible image of the object, the steps of adjusting the degree of enlargement of the reproduced image by varying the amplitude of the oscillations producing the deflecting fields for said electron image with respect to the amplitude of the oscillations producing the deflecting fields for the electron beam of said Braun tube, and varying the size of said stationary aperture in reverse proportion to the selected degree of enlargement.

2. In a method of electronoptically enlarging images of objects which comprises converting a light image of the object into an electron image, moving said electron image back and forth over a stationary aperture by subjecting said electron image to deflecting fields produced by a source of oscillations, and controlling by the electron currents passing through said aperture and which represent image points of said electron image the intensity of the electron beam of a Braun tube which reproduces an enlarged visible image of the object, the steps of adjusting the degree of enlargement of the reproduced image by varying the amplitude of the oscillations producing the deflecting fields for said electron image with respect to the amplitude of the oscillations producing the deflecting fields for the electron beam of said Braun tube, and varying electrically the effective size of said stationary aperture in reverse proportion to the selected degree of enlargement.

3. In a method of electronoptically enlarging images of subjects, including the steps of projecting with light having a short wave length, for instance X-rays, an image of the object onto a photo cathode, assembling the electrons emitted from said photo cathode in a plane spaced from said cathode to form an electron image of said object, moving said electron image back and forth over a stationary aperture by subjecting said electron image to deflecting fields produced by a source of oscillations, multiplying by secondary electron emission the electrons passing through said aperture, amplifying said multiplied electrons, and controlling by said amplified electrons which represent image points of said electron image the intensity of the electron beam of a Braun tube which reproduces an enlarged visible image of the object, the steps of adjusting the degree of enlargement of the reproduced image by varying the amplitude of the oscillations producing the deflecting fields for said electron image with respect to the amplitude of the oscillations producing the deflecting fields for the electron beam of said Braun tube and varying electrically the effective size of said stationary aperture in reverse proportion to the selected degree of enlargement.

MARTIN PLOKE.